US012251865B2

(12) United States Patent
Bader

(10) Patent No.: US 12,251,865 B2
(45) Date of Patent: Mar. 18, 2025

(54) METHOD FOR CONTROLLING THE FILLING OF AT LEAST ONE CAVITY

(71) Applicant: PRIAMUS SYSTEM TECHNOLOGIES AG, Schaffhausen (CH)

(72) Inventor: Christopherus Bader, Neftenbach (CH)

(73) Assignee: PRIAMUS SYSTEM TECHNOLOGIES AG, Schaffhausen (CH)

( * ) Notice: Subject to any disclaimer, the term of this patent is extended or adjusted under 35 U.S.C. 154(b) by 339 days.

(21) Appl. No.: 15/038,534

(22) PCT Filed: Nov. 24, 2014

(86) PCT No.: PCT/EP2014/075395
§ 371 (c)(1),
(2) Date: May 23, 2016

(87) PCT Pub. No.: WO2015/075226
PCT Pub. Date: May 28, 2015

(65) Prior Publication Data
US 2016/0303787 A1    Oct. 20, 2016

(30) Foreign Application Priority Data

Nov. 22, 2013   (DE) .................... 10 2013 112 954.4
Oct. 14, 2014   (DE) .................... 10 2014 114 874.6

(51) Int. Cl.
*B29C 45/77*  (2006.01)
*B29C 45/23*  (2006.01)
*B29C 45/28*  (2006.01)
*B29C 45/76*  (2006.01)
*B29C 45/27*  (2006.01)

(52) U.S. Cl.
CPC ............ *B29C 45/77* (2013.01); *B29C 45/231* (2013.01); *B29C 45/2806* (2013.01); *B29C 45/76* (2013.01); *B29C 45/2708* (2013.01); *B29C 2045/2872* (2013.01); *B29C 2945/76006* (2013.01); *B29C 2945/7604* (2013.01); *B29C 2945/76056* (2013.01); *B29C 2945/76257* (2013.01); *B29C 2945/76274* (2013.01); *B29C 2945/76381* (2013.01); *B29C 2945/76545* (2013.01); *B29C 2945/76688* (2013.01); *B29C 2945/76859* (2013.01)

(58) Field of Classification Search
CPC ... B29C 45/77; B29C 45/2806; B29C 45/231; B29C 45/76; B29C 2945/76056; B29C 2945/76859; B29C 2945/76274; B29C 2945/76257; B29C 2945/76545; B29C 2945/76688; B29C 2945/76006; B29C 2945/7604; B29C 2945/76381; B29C 2045/2872; B29C 45/2708

USPC ......................................................... 264/40.1
See application file for complete search history.

(56) References Cited

U.S. PATENT DOCUMENTS

| 4,066,725 A * | 1/1978 | Boettner ................. B29C 45/76 264/40.5 |
| 5,360,329 A * | 11/1994 | Lemelson ........... B29C 37/0032 264/328.14 |
| 5,556,582 A | 9/1996 | Kazmer |
| 5,741,446 A * | 4/1998 | Tahara ................. B29C 45/1704 425/546 |
| 5,762,855 A | 6/1998 | Betters et al. |
| 6,228,309 B1 * | 5/2001 | Jones ................... B29C 45/2806 264/328.8 |
| 6,428,738 B1 * | 8/2002 | Winget ............. B29C 45/14811 264/513 |
| 6,514,440 B1 | 2/2003 | Kazmer et al. |
| 7,175,420 B2 * | 2/2007 | Babin ..................... B29C 45/30 425/572 |
| 7,597,827 B2 | 10/2009 | Frey |
| RE40,952 E * | 11/2009 | Olaru ....................... B29C 45/78 425/549 |
| 7,644,620 B2 | 1/2010 | Bader |
| 8,641,943 B1 * | 2/2014 | Kipe ....................... B29C 45/77 425/572 |
| 8,920,703 B2 | 12/2014 | Bader et al. |
| 2004/0047942 A1 * | 3/2004 | Vasapoli ............. B29C 45/2701 425/149 |
| 2004/0076702 A1 * | 4/2004 | Werfeli ................... B29C 45/78 264/40.6 |

(Continued)

FOREIGN PATENT DOCUMENTS

| CN | 1874880 A | 12/2006 |
| DE | 6913568 U | 5/1971 |

(Continued)

OTHER PUBLICATIONS

International Search Report for PCT/EP2014/075395 dated Apr. 8, 2015.
Chinese Examination report for patent Application No. 201480063965.3 dated Dec. 27, 2017.
Kazmer D et al: "Multi-Cavity Pressure Control in the Filling and Packing Stages of the Injection Molding Process", Polymer Engineering and Science, Brookfield Center, US, vol. 37, No. 11, Nov. 1, 1997 (Nov. 1, 1997), pp. 1865-1879, XP000776243, Issn: 0032-3888, DOI: 10.1002/PEN.11837.

(Continued)

*Primary Examiner* — Emmanuel S Luk
(74) *Attorney, Agent, or Firm* — CANTOR COLBURN LLP

(57) ABSTRACT

A method for controlling the filling of at least one cavity in a device for producing an object, in particular in an injection molding machine, wherein a melt is inserted into the cavity through an opening, and the width thereof is altered, wherein the width of the opening is also to be changed and adjusted, that is, fixed, in a position between a closed position and a maximal open position.

20 Claims, No Drawings

(56) References Cited

U.S. PATENT DOCUMENTS

| | | | |
|---|---|---|---|
| 2004/0113303 A1 | 6/2004 | Frey | |
| 2004/0150125 A1* | 8/2004 | Huard | F16K 1/38 |
| | | | 264/1.1 |
| 2004/0161490 A1* | 8/2004 | Babin | B29C 45/30 |
| | | | 425/570 |
| 2004/0166189 A1* | 8/2004 | Babin | B29C 45/2704 |
| | | | 425/570 |
| 2008/0223144 A1 | 9/2008 | Bader | |
| 2009/0179350 A1 | 7/2009 | Bader et al. | |
| 2010/0055226 A1* | 3/2010 | Gunther | B29C 33/0061 |
| | | | 425/547 |
| 2010/0225025 A1* | 9/2010 | Striegel | B29C 45/281 |
| | | | 264/328.8 |
| 2012/0248652 A1 | 10/2012 | Galati et al. | |
| 2013/0087950 A1* | 4/2013 | Gunther | B29C 45/281 |
| | | | 264/402 |
| 2013/0255371 A1* | 10/2013 | Beaumont | G01F 1/05 |
| | | | 73/196 |
| 2014/0210119 A1* | 7/2014 | Galati | B29C 45/2703 |
| | | | 264/40.5 |
| 2014/0306365 A1* | 10/2014 | Duffy | B29C 45/1607 |
| | | | 425/130 |
| 2015/0266216 A1* | 9/2015 | Bazzo | B29C 45/0046 |
| | | | 264/328.12 |
| 2018/0015652 A1* | 1/2018 | Galati | B29C 45/76 |
| 2018/0141248 A1* | 5/2018 | Galati | B29C 45/0046 |
| 2018/0194050 A1* | 7/2018 | Galati | B29C 45/281 |

FOREIGN PATENT DOCUMENTS

| | | | | |
|---|---|---|---|---|
| DE | 7323461 | U | 11/1973 | |
| DE | 10112126 | A1 | 12/2002 | |
| DE | 102004003278 | A1 | 8/2005 | |
| DE | 102004031546 | A1 | 2/2006 | |
| DE | 202010014740 | U1 | 12/2010 | |
| EP | 0909628 | B1 * | 8/1998 | |
| EP | 1013395 | B1 * | 7/2003 | |
| EP | 2360003 | A1 | 8/2011 | |
| JP | 60-212321 | A | 10/1985 | |
| JP | 2-182363 | A | 7/1990 | |
| JP | 2001-96582 | A | 4/2001 | |
| WO | 9842490 | A1 | 10/1998 | |
| WO | 200035655 | A1 | 6/2000 | |
| WO | 02072331 | A1 | 9/2002 | |
| WO | 02081177 | A1 | 10/2002 | |
| WO | WO-2005021235 | A1 * | 3/2005 | B29C 45/2806 |

OTHER PUBLICATIONS

German office action for patent Application No. 14 818 890.7-1014 dated May 14, 2018.

Chinese office action for patent application No. 201480063965.3 dated Nov. 1, 2019.

* cited by examiner

METHOD FOR CONTROLLING THE FILLING OF AT LEAST ONE CAVITY

BACKGROUND OF THE INVENTION

The invention relates to a method for regulating the filling of at least one cavity in an apparatus for producing an article, in particular in an injection-molding machine.

In particular in injection-molding but also in the production of articles by other production methods in which a mass, in particular a melt, is intended to be introduced into a cavity in which the article is molded, a major problem is the fact that the filling changes over time for whatever reasons, and this results in different part qualities. For this reason, attempts have been made, with varying degrees of success, to make the filling of the cavities uniform. This goes both for single-cavity molds and for multi-cavity molds.

If for example needle valve nozzles are used, each individual needle valve nozzle can be considered to be an injection unit of an injection-molding machine. If changes to parameters, for example the viscosity, are desired, it is only possible to alter, and if appropriate even to regulate, the setting of the machine. As a consequence, the entire injection-molding operation took place in a virtually uniform manner in all the valve nozzles (approximately identical injection speed or melt-front speed, identical compression, etc.). Thus, it is not possible to react to different properties (for example different wall thicknesses). For example, large-area moldings, for example bumpers, can only be considered over the entire cross section, even though they are quite likely also to have different requirements in subregions.

For example, DE 101 12 126 B4 describes a method for automatically balancing the volumetric filling of cavities, wherein a temperature profile in the cavities is determined and is made uniform for all cavities. In a multi-cavity mold, the temporal offset of the signals is determined in this case. If the increase in the signals from the individual cavities is identical, these are automatically filled volumetrically at the same time.

DE 10 2004 031 546 A1 describes a method for filling at least one cavity of a mold, wherein the melt is introduced into the cavity under pressure from a plurality of nozzles. In this case, each nozzle is preferably assigned a sensor which determines the melt flow in the cavity, wherein the signals from this sensor are used to automatically coordinate the filling operations through the nozzles automatically with one another.

In both cases, regulation can be achieved in that the temperature of the individual hot runner nozzles is altered until uniform filling of the cavities has been achieved. In this case, it is conceivable for the melt front at the end of the flow path to be detected automatically on account of a signal increase. However, it is likewise possible that for example a pressure sensor is placed in the vicinity of the ingate and a pressure threshold is used for such regulation.

In a different application, the mold is not a multi-cavity mold but for example a mold with only one cavity. In this case, the melt flow is regulated in that the change in the hot runner nozzle temperature is used to constantly regulate a once-optimized reference filling time (for example between two nozzles).

The abovementioned regulations relate primarily to hot runner molds. However, there are also cold runner molds, which do not have hot runner nozzles. This is in particular the case when, rather than thermoplastics, crosslinked plastics, such as liquid silicones, are used. In such cases, the injection operation is controlled usually via what are known as needle valve nozzles. Such needle valve nozzles have already been known for a long time. For example, they are already described in DE 6913568 and DE 73 23 461 U. A more recent description can be found in DE 20 2010 014 740 U1. These are opened at a particular time and closed again at a later time, although this can nevertheless result in an unbalanced state.

Lately, there have also been valve nozzles which cannot just be opened and closed again. These valve nozzles can be opened and closed individually and in a stepwise manner, such that ultimately the injected volume of the plastic melt can be altered in a deliberate manner.

U.S. Pat. No. 6,514,440 B1 deals with the controlling of the melt flow during the injection operation. A conical head is located far upstream of the injection opening in the melt duct, said conical head cooperating with a conical seat in the melt duct in order to regulate the melt flow. A nozzle pin on which the conical head is arranged is opened at the beginning of the injection cycle and closed at the end of the injection cycle. During the cycle, the valve pin can adopt intermediate positions between an open and closed position, in order to reduce or increase the flowrate of the melt.

Also described is the fact that a pressure sensor is arranged upstream of the valve head in the melt duct, the signals from said pressure sensor being passed on to a control unit. There, the signals are compared with corresponding predetermined values and the valve head is set accordingly.

EP 2 360 003 A1 describes a method and an apparatus for controlling a needle valve nozzle of an injection mold. In that case, the volumetric flow of the plastic melt is intended to be controlled during the injection operation.

US 2012/0248652 A relates to an apparatus for controlling the flow of a melt in a cavity. In that case, the process is a cascade process in which a cavity is filled through injection openings arranged at different locations. For charging, a needle closing the particular opening is raised such that the opening is freed or closed. In that case, this retraction can also take place at different speeds, with the result that the filling of the cavity is regulated.

JP 2001096582 A reveals that it deals with the production of a large article, wherein a plurality of injection openings have to be regulated. In that case, the pressure of the melt in the vicinity of the sprue opening is determined. When the pressure exceeds a predetermined value, the opening width is reduced in order to stop injection, or the quantity of melt introduced by this injection opening is reduced. There, too, the process is the cascade process, which has already been known for a long time.

The problem addressed by the present invention is that of developing a method of the abovementioned type, with which the filling of cavities can be regulated and in particular balanced in a simple manner.

SUMMARY OF THE INVENTION

The problem is solved by the features of the method of the present invention by varying melt flow into a cavity.

DETAILED DESCRIPTION

The principle of the invention is that an opening, through which a melt is introduced into a cavity, cannot just be opened or closed but can also be brought into an intermediate position. Preferably, this intermediate position is likewise not defined but can be adapted to predetermined values or changed requirements of an injection-molding cycle. However, they can also be defined by a predetermined profile.

In this way, the entire injection-molding operation can be revolutionized. The entire injection-molding operation is controlled simply by the width of the injection opening also being set during the injection-molding cycle on the basis for example of a predetermined profile. This can take place for example completely independently of the configuration of an upstream extruder or an upstream pump for feeding the plastic melt. It is sufficient for the plastic melt to be present at the injection opening at a sufficient pressure; the quantity and speed of plastic which is then let into the cavity can be determined by the alteration to the injection opening. However, this also means that the upstream units can be designed and controlled in a very simple manner.

If, for example, a melt front reaches a temperature sensor monitoring the cavity too late, it is sufficient to increase the opening width of the injection opening such that more melt can pass more quickly into the cavity, as long as the pressure at which the melt is present at the opening remains the same.

If, for example, it is intended to switch over to holding pressure at the end of the flow path, then it is likewise sufficient for the injection opening to be opened further while the applied melt pressure remains the same. The present invention allows a large number of possibilities for very simple regulation of injection into a cavity, and so a definitive list is not possible here.

Of course, it is also within the scope of the invention that known units that alter the pressure and/or temperature of the melt are connected upstream of such an alterable injection opening. The present invention leaves open only the possibility of the use of very simple units.

Also, in this way, for cold runners and hot runners, the injection operation can be balanced in a multi-cavity mold. As a result of the individual regulation of each separate width of the injection opening or valve nozzle, it is possible to set individual properties for each separate opening or valve nozzle. Thus, it is conceivable, for example, for a valve nozzle to be compressed less in the vicinity of the airbag of an instrument panel (=needle of the valve nozzle closed further) than in a thick-walled cross section. The possibilities and consequences in practice are sometimes tremendous.

The parameters of the melt entering the cavity that are determined and the sensors that are intended to be used for this purpose play a subordinate role for the present invention. The basic concept of the invention relates to the fact that a width of the opening is used to make a filling operation for one or more cavities uniform. Of course, it is also possible to adapt the filling operation to a predetermined reference value.

The term nozzle or nozzle opening should be understood broadly. Any opening through which a melt is introduced into the cavity and the width of which is alterable is within the scope of the invention. Needle valve nozzles are only one possibility here. By way of special drive components, it is nowadays possible to adjust for example a valve needle path with a resolution of 0.005 mm. This means that a width of the opening can be set very precisely and independently of one another even in the case of very small injection nozzles. The present invention is concerned with regulating the injection-molding process in that one or more needles of valve nozzles are not just opened and closed but the opening of the individual needles is regulated in any position between opening and closing.

The opening could also be determined by a device similar to a camera shutter, however. Sliders or the like are also conceivable for altering the opening width.

In the preferred exemplary embodiment, temperature sensors and/or pressure sensors are used. However, other sensors, for example electric sensors or visual sensors which observe a travel of a melt are also conceivable. Here, too, no limits are intended to be placed on the present invention. All that is important is that the melt and the progress thereof in the cavity are observed. Pressure sensors determine the pressure profile in the cavity, temperature sensors determine the temperature or only detect when the melt arrives for example at a corresponding temperature sensor. In this case, the temperature sensor acts more like a normal switch which determines the time that a melt needs in order to pass to the sensor from entering the cavity.

In the present case use is made primarily of pressure and temperature sensors as described for example in DE 10 2004 003 278 A1. However, the sensors do not have to come into direct contact with the melt; they can also be separated from the cavity for example by thin webs.

What is novel is especially the possibility that such regulations are carried out automatically with the aid of mold internal pressure sensors and mold wall temperature sensors and as a result can be adapted automatically from cycle to cycle. Most regulations that have already been discussed in the past could thus also be carried out independently of the injection-molding machine for each individual valve nozzle.

The following regulations come into question:

a) Hot runner balancing via the opening width of the needle valve nozzles.

b) Hot runner regulation via the opening width of a needle valve nozzle (regulates the melt flow in a particular range, for example on the basis of a reference).

c) Cold runner balancing via the opening width of the needle valve nozzles.

d) Shear rate regulation for each individual valve nozzle via the opening width of the needle valve nozzle. This means that the shear rate in the melt flow is measured via two sensors and the position of the needle is altered in a corresponding manner.

e) Shear stress regulation (similar to d).

f) Very important: compression regulation for each individual valve nozzle via the opening width of the needle valve nozzle. This means that after the injection operation or after switching over to holding pressure, the position of the nozzle is altered again in order to generate more or less compression upstream of the particular nozzle. In this case, the mold internal pressure is measured at a threshold (for example at 80% of the maximum value) in a similar manner to the compression regulation that is already carried out.

g) Individual regulation of the cooling time for each individual needle valve nozzle via the opening width of the needle valve nozzle in the case of hot runners (thermoplastics). This means that each nozzle is closed individually as soon as the necessary cooling time for this section has been achieved.

h) Individual regulation of the reaction time for each individual needle valve nozzle via the opening width of the needle valve nozzle in the case of cold runners (thermosets, LSR, reaction methods such as RIM). This means that each nozzle is closed individually as soon as the necessary reaction time for this section has been achieved.

i) Individual regulation of multicomponents via the opening width of valve nozzles. This means that any desired number of material components can be regulated individually.

j) Individual regulation of valve nozzles which overmold insert parts at some nozzles but not at others.

k) Individual regulation of valve nozzles which overmold insert parts with different sizes.

l) Individual regulation of valve nozzles which are intended to be regulated differently depending on position in cascade processes. This means that the flow path from the first nozzle to the second takes place at a different speed or with different compression, in contrast with the second, third or following flow path.

m) Individual regulation of different parts of a family mold in which the properties of each individual part are settable individually.

n) Individual regulation of valve nozzles in gas internal pressure and water injection processes.

This list is in no way definitive, however!

Most of the regulations mentioned, which are of course not definitive in the context of the invention, come into question for cold runners and hot runners.

It is of particular importance and should be emphasized for all regulations that it is possible for not just a single value to be set and regulated per nozzle, but also an entire setting profile (for nozzle opening and closing). The consequences are that the process can take place largely independently of the machine setting, since it is regulation in the mold. It is possible to dispense with expensive machine interfaces. Many machine manufacturers do not even offer such a machine interface.

The invention also includes an apparatus for carrying out the method, in which the opening is assigned a device for altering the width of the opening on the basis of signals which come from at least one sensor in the cavity. In between, a regulating unit should be connected which compares the signals with one another and/or with predetermined signals and accordingly regulates the width of the opening in order to make the injection process uniform. Preferably, the sensor is used as it were as a switch which reacts when the melt front reaches it. In this case, it emits a signal such that the regulation of the opening width can begin.

The invention claimed is:

1. A method for regulating the filling of a cavity in an injection-molding machine, the method comprising:
   providing an injection molding machine with a cavity and a needle valve nozzle having an outlet, the outlet of the needle valve nozzle being arranged at an opening of the cavity for injection of a melt into the cavity via the outlet, wherein a width of the outlet of the needle valve nozzle is adjustable by movement of a needle between a fully open position and a fully closed position, the needle being separated from the outlet of the needle valve nozzle in the fully open position;
   filling the cavity by introducing the melt into the cavity from the outlet of the needle valve nozzle; and
   monitoring a position of a melt front of the melt within the cavity using at least one sensor arranged within the cavity, the at least one sensor including at least one of a temperature sensor and a pressure sensor;
   wherein, during the introducing of the melt into the cavity or during a compression phase, the width of the outlet of the needle valve nozzle is altered to regulate the filling the cavity by moving the needle to one or more intermediate positions in response to a signal from the at least one sensor, the one or more intermediate positions of the needle being arranged between the fully open position and the fully closed position.

2. The method of claim 1, further comprising performing compression regulation after switching over to holding pressure, wherein during the compression regulation, the position of the needle is altered to adjust the width of the outlet in response to the shear stress.

3. The method of claim 1, wherein the needle is retracted into the needle valve nozzle in the fully open position.

4. The method of claim 1, wherein the cavity is one of a plurality of cavities and the needle valve nozzle is one of a plurality of needle valve nozzles, an outlet of each of the plurality of needle valve nozzles being arranged adjacent to the opening of a corresponding cavity of the plurality of cavities for injection of the melt into the corresponding cavity, the method further comprising individually regulating the width of the outlet of each of the plurality of needle valve nozzles depending on the position of each of the plurality of cavities within a cascade, wherein a flow path from a first needle valve nozzle of the plurality of needle valve nozzles to a second needle valve nozzle of the plurality of needle valve nozzles has a different compression or speed than the flow path between the second needle valve nozzle of the plurality of needle valve nozzles and a third needle valve nozzle of the plurality of needle valve nozzles.

5. The method of claim 1, wherein the cavity is one of a plurality of cavities and the needle valve nozzle is one of a plurality of needle valve nozzles, an outlet of each of the plurality of needle valve nozzles being arranged adjacent to the opening of a corresponding cavity of the plurality of cavities for injection of the melt into the corresponding cavity, wherein at least a portion of the plurality of cavities in combination form a family mold and properties of each part associated with a respective cavity of the family mold are individually settable, the method further comprising regulating the plurality of needle valve nozzles associated with the portion of the plurality of cavities that form the family mold individually.

6. The method of claim 1, wherein the at least one sensor is positioned toward an end of a flow path of the melt within the cavity.

7. The method of claim 1, wherein the at least one sensor includes a temperature sensor arranged within the cavity, the temperature sensor being operable as a switch to determine a time of travel of the melt between the opening and the temperature sensor.

8. The method of claim 1, wherein the at least one sensor includes a temperature sensor arranged within the cavity, wherein in response to the melt front reaching the temperature sensor after an expected time, increasing a width of the outlet to increase a flow of melt into the cavity while maintaining a constant pressure at which the melt is present at the outlet.

9. The method of claim 1, wherein the at least one sensor includes a temperature sensor, the temperature sensor being positioned near the outlet of the needle valve nozzle.

10. The method of claim 1, wherein the cavity is one of a plurality of cavities and the needle valve nozzle is one of a plurality of needle valve nozzles, an outlet of each of the plurality of needle valve nozzles being arranged adjacent to the opening of a corresponding cavity of the plurality of cavities for injection of the melt into the corresponding cavity, the plurality of cavities being balanced during the filling of the cavity.

11. The method of claim 1, wherein the width of the outlet is regulated during an injection-molding cycle.

12. The method of claim 1, wherein the width of the outlet is regulated according to a predetermined profile.

13. The method of claim 1, wherein the method for regulating the filling of the cavity is automatically adapted from cycle to cycle.

14. The method of claim 1, wherein the at least one sensor includes two sensors, the method further comprising:
monitoring a shear rate measured by the two sensors; and
altering the position of the needle in response to the measured shear rate to adjust the width of the outlet.

15. The method of claim 1, wherein the at least one sensor includes two sensors, the method further comprising:
monitoring a shear stress measured by the two sensors; and
altering the position of the needle in response to the measured shear stress to adjust the width of the outlet.

16. The method of claim 1, wherein the cavity is one of a plurality of cavities and the needle valve nozzle is one of a plurality of needle valve nozzles, an outlet of each of the plurality of needle valve nozzles being arranged adjacent to the opening of a corresponding cavity of the plurality of cavities for injection of the melt into the corresponding cavity, wherein each of the plurality of needle valve nozzles is a hot runner needle valve nozzle; the method further comprising:
regulating a cooling time of each of the plurality of needle valve nozzles; and
closing each of the plurality of needle valve nozzles individually by moving the needle to the fully closed position immediately after the cooling time has been achieved.

17. The method of claim 1, wherein in the case of cold runners the cavity is one of a plurality of cavities and the needle valve nozzle is one of a plurality of needle valve nozzles, an outlet of each of the plurality of needle valve nozzles being arranged adjacent to the opening of a corresponding cavity of the plurality of cavities for injection of the melt into the corresponding cavity, wherein each of the plurality of needle valve nozzles is a cold runner needle valve nozzle; the method further comprising:
regulating a reaction time of each of the plurality of needle valve nozzles; and
closing each of the plurality of needle valve nozzles individually by moving the needle to the fully closed position immediately after the reaction time has been achieved.

18. The method of claim 1, wherein the cavity is one of a plurality of cavities and the needle valve nozzle is one of a plurality of needle valve nozzles, an outlet of each of the plurality of needle valve nozzles being arranged adjacent to the opening of a corresponding cavity of the plurality of cavities for injection of the melt into the corresponding cavity; the method further comprising regulating a plurality of material components by altering the width of the outlet of the plurality of needle valve nozzles individually.

19. The method of claim 1, wherein the cavity is one of a plurality of cavities and the needle valve nozzle is one of a plurality of needle valve nozzles, an outlet of each of the plurality of needle valve nozzles being arranged adjacent to the opening of a corresponding cavity of the plurality of cavities for injection of the melt into the corresponding cavity, each of the plurality of cavities being associated with overmolding an insert part, the method further comprising individually regulating only a portion of the plurality of needle valve nozzles.

20. The method of claim 1, wherein the cavity is one of a plurality of cavities and the needle valve nozzle is one of a plurality of needle valve nozzles, an outlet of each of the plurality of needle valve nozzles being arranged adjacent to the opening of a corresponding cavity of the plurality of cavities for injection of the melt into the corresponding cavity to overmold an insert part, wherein the insert parts associated with the plurality of cavities have different sizes, the method further comprising regulating the plurality of needle valve nozzles individually.

\* \* \* \* \*